United States Patent
Alexander et al.

(10) Patent No.: US 9,921,569 B2
(45) Date of Patent: Mar. 20, 2018

(54) FIELD DEVICE COMMISSIONING SYSTEM AND METHOD

(71) Applicant: YOKOGAWA ELECTRIC CORPORATION, Musashino-shi, Tokyo (JP)

(72) Inventors: Bobby Varghese Alexander, Singapore (SG); Senthilkumar Chockalingam, Singapore (SG)

(73) Assignee: Yokogawa Electric Corporation, Tokyo (JP)

(*) Notice: Subject to any disclaimer, the term of this patent is extended or adjusted under 35 U.S.C. 154(b) by 272 days.

(21) Appl. No.: 14/640,113

(22) Filed: Mar. 6, 2015

(65) Prior Publication Data

US 2016/0259315 A1    Sep. 8, 2016

(51) Int. Cl.
*G05B 19/401* (2006.01)
*G05B 19/042* (2006.01)

(52) U.S. Cl.
CPC ....... *G05B 19/401* (2013.01); *G05B 19/0426* (2013.01); *G05B 2219/25068* (2013.01);
(Continued)

(58) Field of Classification Search
CPC .............. G05B 19/0426; G05B 19/401; G05B 2219/25068; G05B 2219/25428; G05B 2219/31362; G05B 2219/31439
See application file for complete search history.

(56) References Cited

U.S. PATENT DOCUMENTS 6,618,630 B1    9/2003 Jundt et al.
7,069,580 B1    6/2006 Deitz et al.
(Continued)

FOREIGN PATENT DOCUMENTS

WO    2007/121141 A2    10/2007

OTHER PUBLICATIONS

"Description of Instrument Functions Prosonic S Fmu90", Endress + Hauser, Jul. 23, 2009, URL:https://portal.endress.com/wa001/dla/5000264/8521/000/05/BA290FEN_0709.pdf, pp. 1-216 (216 pages).
(Continued)

*Primary Examiner* — Abdelmoniem Elamin
(74) *Attorney, Agent, or Firm* — Sughrue Mion, PLLC (57) ABSTRACT

A field device commissioning system includes a commissioning tool configured to communicate with a repository and an input-output (IO) device, the IO device is configured to communicate with a field device. The commissioning tool includes a first processor configured to retrieve engineering data for the IO device or the field device from the repository, retrieve a first configuration parameter value for the IO device or the field device from the IO device, determine a second configuration parameter value for the IO device or the field device from the retrieved engineering data, the second configuration parameter corresponds to the first configuration parameter, determine if the first configuration parameter value is the same as the second configuration parameter value; and generate alert on a user interface with when the first configuration parameter value is not the same as the second configuration parameter value, wherein the IO device comprises a second processor.

11 Claims, 8 Drawing Sheets

(52) U.S. Cl.
CPC .............. *G05B 2219/25428* (2013.01); *G05B 2219/31362* (2013.01); *G05B 2219/31439* (2013.01)

(56) References Cited

U.S. PATENT DOCUMENTS

| | | | |
|---|---|---|---|
| 8,832,236 B2 * | 9/2014 | Hernandez | G05B 19/042 318/568.2 |
| 8,994,493 B2 * | 3/2015 | Nakamoto | G05B 19/418 340/1.1 |
| 9,052,708 B2 * | 6/2015 | Vishwanath | G05B 19/41845 |
| 9,563,188 B2 * | 2/2017 | Banerjee | G05B 15/02 |
| 2002/0142719 A1 | 10/2002 | Maneval | |
| 2007/0075916 A1 | 4/2007 | Bump et al. | |
| 2007/0250180 A1 | 10/2007 | Bump et al. | |
| 2009/0118843 A1 | 5/2009 | Rahman et al. | |
| 2011/0191500 A1 | 8/2011 | Odayappan et al. | |
| 2011/0313547 A1 | 12/2011 | Hernandez et al. | |
| 2012/0250544 A1 | 10/2012 | Sasaki et al. | |
| 2013/0170378 A1 * | 7/2013 | Ray | G01S 5/0289 370/252 |
| 2014/0067091 A1 | 3/2014 | Vishwanath et al. | |
| 2014/0130874 A1 | 5/2014 | Burlage et al. | |
| 2015/0039130 A1 * | 2/2015 | Banerjee | G05B 15/02 700/275 |

OTHER PUBLICATIONS

Anonymous, "HART: Field Communications Protocol, Application Guide", HART Communication Foundation, 1999, XP-002219606, pp. 1-92 (92 pages).

* cited by examiner

| Property | IOM Values | Device List Values |
|---|---|---|
| Device Tag | | |
| Device ID | | |
| Vendor Name | | |
| Model Name | | |
| Vendor Code | | |
| Device Address | | |
| Device Type ID | | |
| Device Revision | | |

☐ Reset Tasks

[ Merge ]   [ Close ]

FIELD DEVICE COMMISSIONING SYSTEM AND METHOD

FIELD OF INVENTION

The disclosure generally relates to a field device commissioning system and a method of commissioning a field device in an industrial plant.

BACKGROUND

In an industrial plant, there are many systems which are configured to monitor or control field devices and equipment. The systems are configured to communicate with the field devices through input-output (IO) units. An IO unit is configured to communicate with a plurality of field devices and systems in the plant. The IO unit is connected directly to the field devices and connected to a bus for communication with the plant systems.

Commissioning is a process for testing an equipment, facility, or plant to verify if it functions according to its design objectives or specifications. During commissioning of a typical plant which has multiple field devices, for example, thousands of field devices, it is a tedious series of manual operations to check if each field device is installed correctly and if each IO unit is configured correctly. Each of the field device and the IO unit has multiple configuration parameters. The installation checking process is to check if the correct field device is installed at the physical location and its connection position to the IO unit. Usually, a plurality of field devices are connected to one IO unit, where one field device is connected to one channel on the IO unit. The configuration of the IO unit is checked to determine that the channels are configured correctly.

Other methods to check the IO unit and field devices are using a control system or plant management system when the system is connected to the same bus as the IO unit. The check cannot be done before the installation of at least one of the control system or plant management system in the plant is completed. It is inconvenient to correct the configuration parameters when the IO unit and field devices are determined to be inconsistent with the design objectives.

There is a need for an improved system and method for performing commissioning of a plant.

SUMMARY

A field device commissioning system includes a commissioning tool configured to communicate with a repository and an input-output (IO) device, the IO device is configured to communicate with a field device. The commissioning tool includes a first processor configured to retrieve engineering data for the IO device or the field device from the repository, retrieve a first configuration parameter value for the IO device or the field device from the IO device, determine a second configuration parameter value for the IO device or the field device from the retrieved engineering data, the second configuration parameter corresponds to the first configuration parameter, determine if the first configuration parameter value is the same as the second configuration parameter value; and generate alert on a user interface with when the first configuration parameter value is not the same as the second configuration parameter value, wherein the IO device comprises a second processor.

DETAILED DESCRIPTION

Reference will now be made in detail to the embodiments of the invention, examples of which are illustrated in the accompanying drawings. While some aspects of the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed descriptions of the present invention, numerous specific details are set forth in order to provide a thorough understanding of the present invention. However, it will be obvious to one of ordinary skill of the art that the present invention may be practiced without these specific details. In other instances, well known methods, procedures, components, and features have not been described in detail as not to unnecessarily obscure aspects of the present invention.

Figure 1A:
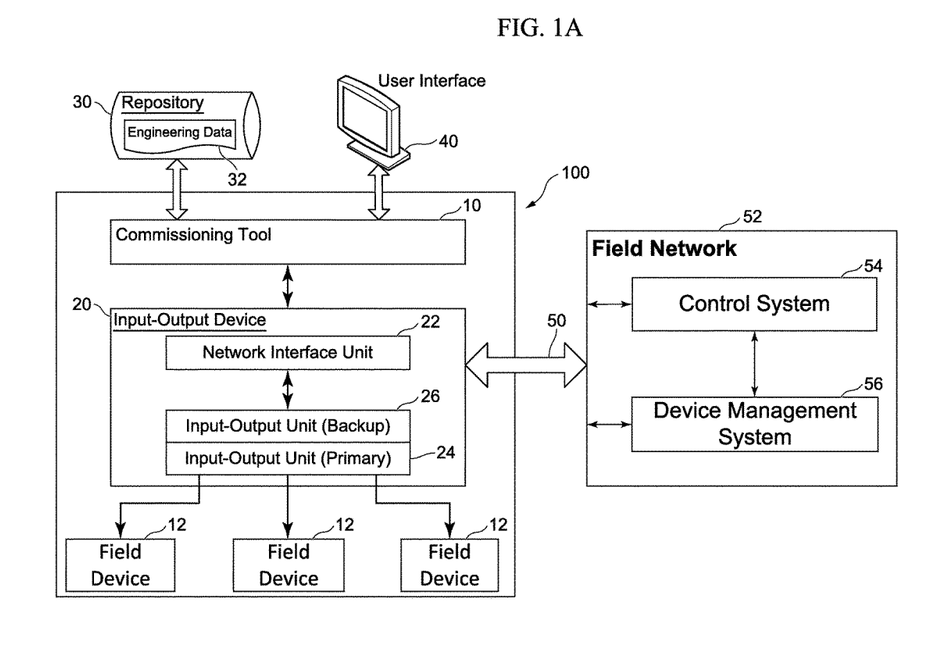
FIG. 1A is a block diagram of a plant system including a commissioning tool according to some embodiments of the invention.

A field device commissioning system 100 is illustrated in FIG. 1A for an industrial plant. The field device commissioning system 100 may include, but is not limited to, a commissioning tool 10, an input-output ("IO") device 20, field devices 12, a repository 30 and a user interface 40. The commissioning tool 10 may be implemented by a processor and a memory storage for performing commissioning tasks to check the field devices 12 and the input-output ("IO") device 20 are configured correctly according to design specifications.

The design specifications are stored in the repository 30 as engineering data 32. An example of the engineering data 32 is an IO list which includes the field devices 12, the IO device 20 and their configuration data. The configuration data are properties or configuration parameters of the field devices 12, the IO device 20 and the values. Examples of the configuration parameters for the IO device 20 are "signal type" which is type of input or output which is processed by a channel in the IO device 20; and "node number" which identifies the IO device 20.

The IO device 20 may include, but is not limited to, a processor, a memory storage, a network interface unit 22, and an IO unit 24. According to some embodiments of the invention, there are two IO units, for example, a primary IO unit 24 and a backup IO unit 26. The IO device 20 is configured to be connected to a bus 50 for communication with a field network 52. Other systems in the industrial plant such as a control system 54 and a device management system 56 are connected to the bus 50. The network interface unit 22 is configured to support at least one direct connection to the commissioning tool 10 and at least one separate direct connection to the bus 50. The direct and separate connections are independent of each other.

The commissioning tool 10 has a processor that is configured to retrieve from the repository 30 engineering data 32 which is relevant for the IO device 20 or the field devices 12. The engineering data 32 is design data for the industrial plant to operate according to design specifications. The relevant engineering data 32 is a configuration file according to some embodiments of the invention. The relevant engineering data 32 is downloaded to the memory storage of the commissioning tool 10. The commissioning tool 10 does not need to communicate with the repository 30 continuously after the download.

The processor of the commissioning tool 10 is also configured to retrieve the configuration data from the IO device 20. The configuration data may include, but is not limited to, configuration parameters for the IO device 20 and configuration parameters for the field devices 12. The configuration data is retrieved by the processor of the IO device 20 from the IO units 24, 26 and the field devices 12 and then transmitted to the processor of the commissioning tool 10 according to some embodiments of the invention. In some alternative embodiments of the invention, the configuration data is stored to the memory storage of the IO device 20 for retrieval when needed.

The processor of the commissioning tool 10 is configured to compare values of the configuration parameters in the downloaded engineering data 32 with values of the corresponding configuration parameters retrieved from the IO device 20 to determine if the both values are the same. The processor of the commissioning tool 10 reflects the determination results on the user interface 40. The determination results are as the result of comparison between the both values. An example of the determination result reflected on the user interface 40 may be an alert in a case that the processor of the commissioning tool 10 determines that the both values are not the same as each other.

Figure 1B:
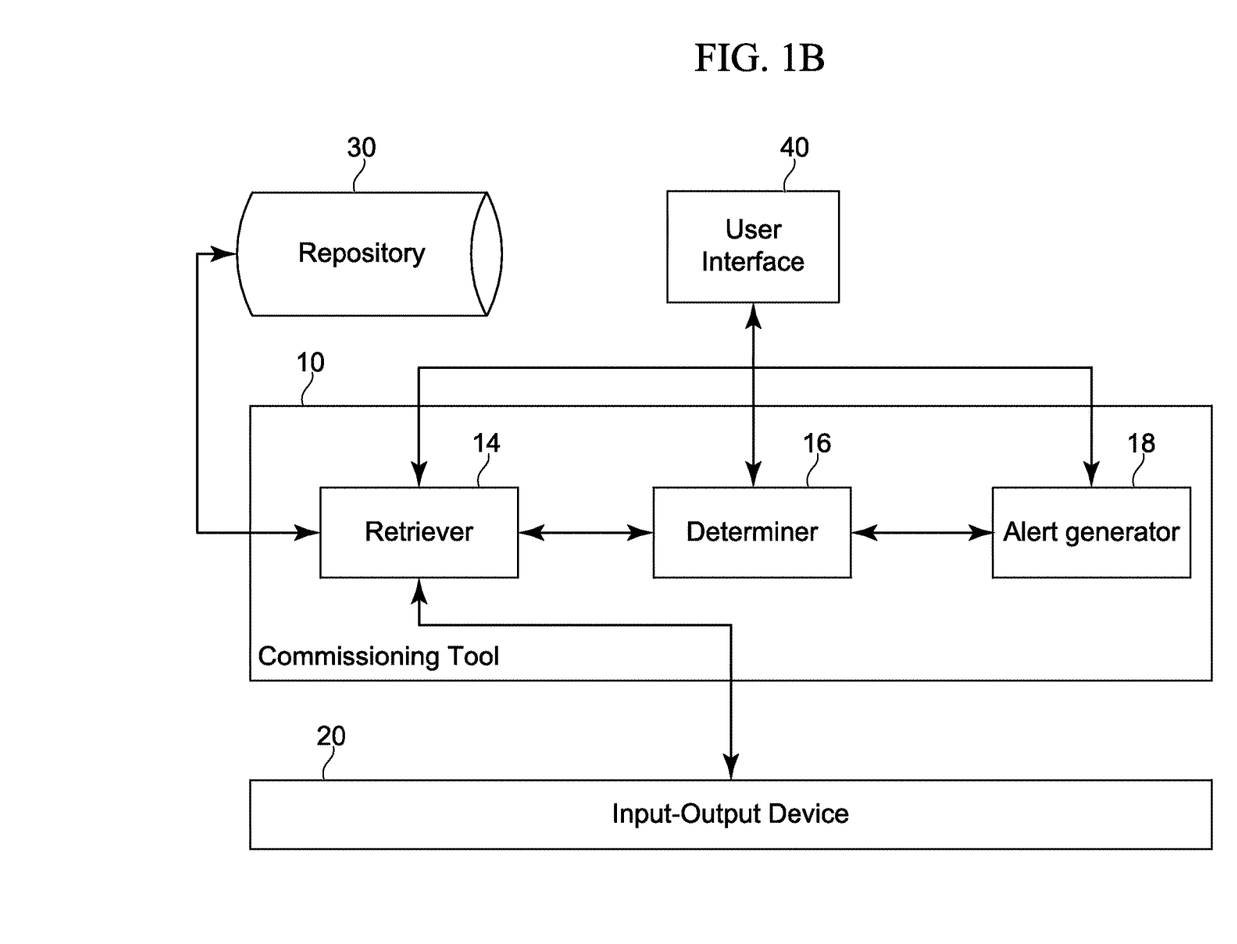
FIG. 1B is a block diagram of the commissioning tool according to some embodiments of the invention.

FIG. 1B illustrates an example of functional blocks in the processor of the commissioning tool 10 according to some embodiments of the invention. A retriever 14 function block retrieves from the repository 30, engineering data 32 for the IO device 20 or one field device 12. The engineering data 32 is stored in the memory storage of the commissioning tool 10. The retriever 14 function block also retrieves from the IO device 20, a first configuration parameter value for the IO device 20 or the field device 12.

A determiner 16 function block determines, from the engineering data 32 stored in the memory storage of the commissioning tool 10, a second configuration parameter value for the IO device 20 or the field device 12. The second configuration parameter corresponds to the first configuration parameter. The determiner 16 function block also determines if the first configuration parameter value is the same as the second configuration parameter value.

An alert generator 18 function block generates an alert on the user interface 40 when the determiner 16 function block determines that the first configuration parameter value is not the same as the second configuration parameter value.

Figure 2:
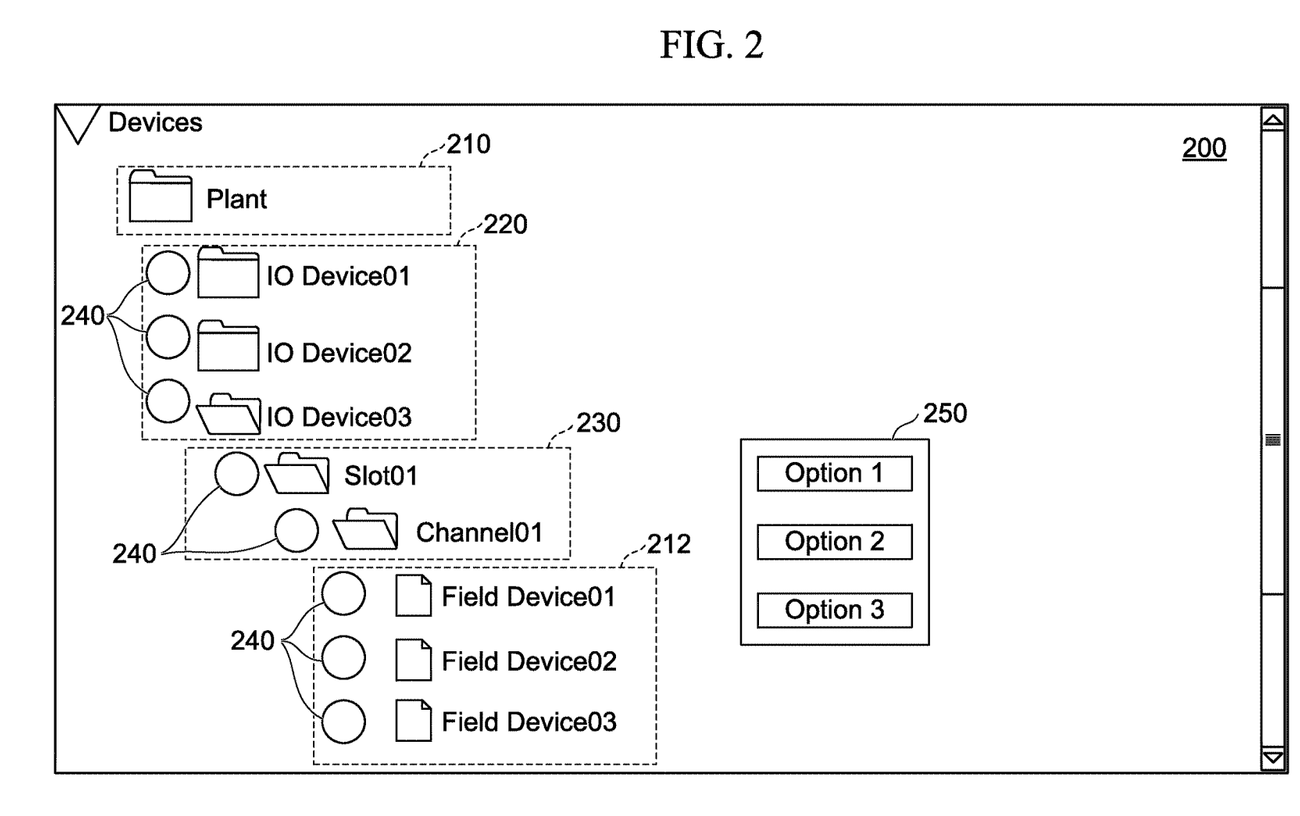
FIG. 2 illustrates an example of a display screen for a tree view or hierarchy view according to some embodiments of the invention.

FIG. 2 illustrates an example of a display screen 200 on the user interface 40 which reflects the comparison results. The display screen 200 shows an example tree view or hierarchy view of the field devices 12 and IO device 20. The industrial plant, project or area name 210 is shown at the top of the tree view. 220 lists the IO devices 20, then 230 lists slot and channel for each IO device 20. 212 lists the field devices 12 connected to each channel. The hierarchy view is generated from the engineering data 32 according to some embodiments of the invention. Alternatively, the hierarchy view is generated from the configuration data retrieved from the IO device 20.

The comparison results are shown in a status of the IO device 20 or field devices 12 according to some embodiments of the invention. For example, the status is represented by icons 240 positioned next to the identifiers of the field devices 12, the identifiers of the IO device 20 and the configuration parameters. The icons 240 are shown in different forms or colors according to some embodiments of the invention. For example, "green" is reflected when there is no difference in the comparison, "yellow" when there is a mismatch and "grey" when the IO device 20, the field device 12 is not in communication with the commissioning tool 10. Fonts of the hierarchy view item are shown in different colors according to some embodiments of the invention.

The commissioning tool 10 is configured to provide a user selectable option to view the comparison results in detail. The user selectable option is provided in a separate window 250 which is triggered for display by user input according to some embodiments of the invention. The window 250 lists a plurality of user selectable validation options according to some embodiments of the invention. For example, a first option to view all the configuration parameters for a selected field device; a second option to view all the configuration parameters for a selected IO device.

Figure 3A:
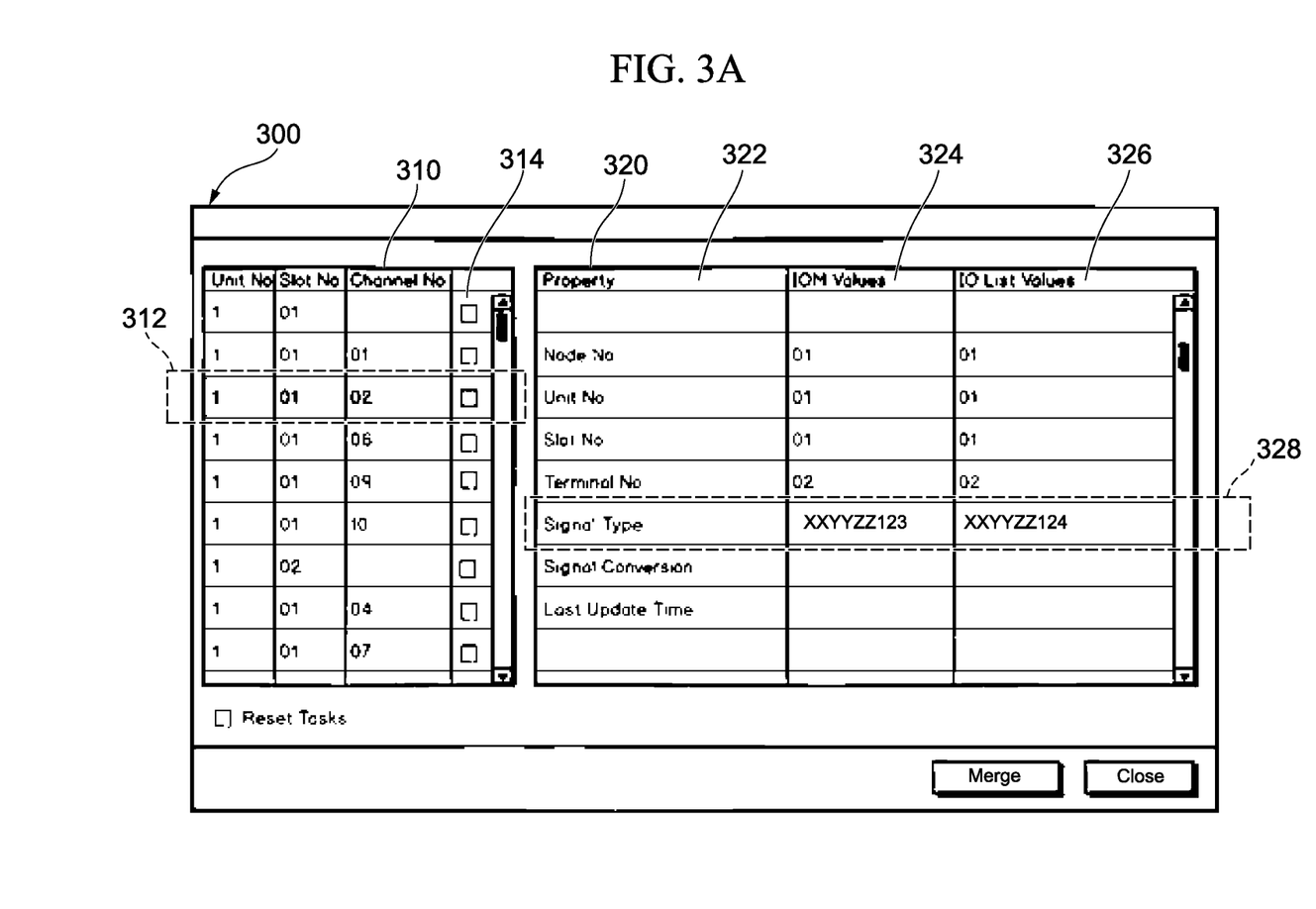
FIGS. 3A, 3B, 3C, and 3D illustrate examples of a comparison table according to some embodiments of the invention.

FIG. 3A is an example of a comparison table 300 generated when the configuration parameters values. The comparison table 300 is generated when a user input is received for the user selectable option according to some embodiments of the invention. FIG. 3A is the example of comparison table when the IO device 20 is selected. An item area 310 is a grid which lists the items in the IO device 20. The items of the IO device 20 may include, but is not limited to, IO units 24, 26 and channels in the IO unit, each channel is configured to connect to one or more field devices 12. The item area 310 lists different items of the IO device 20 according to some embodiments of the invention.

A comparison area 320 is a grid which lists configuration parameters 322, the values 324 retrieved from the IO device 20 and the values 326 of the engineering data 32. The configuration parameters 322 are displayed for a selected item 312 in the item area 310. The selected item 312 is highlighted in a different font color or has a shaded area according to some embodiments of the invention. The values 324, 326 are highlighted in different font color or have a shaded area when the values 324, 326 are different from each other. In this example, a marked area 328 illustrates the values 324, 326 being highlighted in a different font color according to some embodiments of the invention. Advantageously, highlights in different font colors or shaded areas enables a user to easily and efficiently identify the selected item and determine which configuration parameters are different.

The commissioning tool 10 is configured to transfer the values 324 of the IO device 20 to the repository 30 when a check box 314 in the item area 310 is marked according to some embodiments of the invention. According to some embodiments of the invention, the values 324 of the IO device 20 are transferred to the downloaded engineering data 32. The engineering data 32 is then uploaded to the repository 30 as a replacement or a different revision.

Figure 3B:
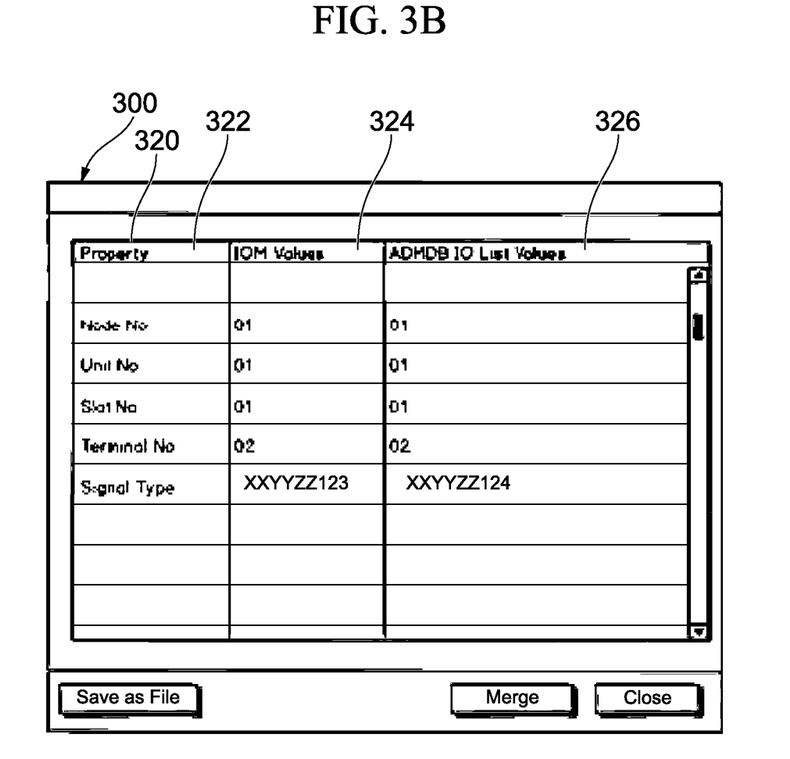

FIG. 3B is an example of the comparison table 300 when one of the channels of the IO device 20 is selected according to some embodiments of the invention. Only the comparison area 320 is displayed with the values 324 of the IO device 20 and the values 326 of the repository 30.

Figure 3C:
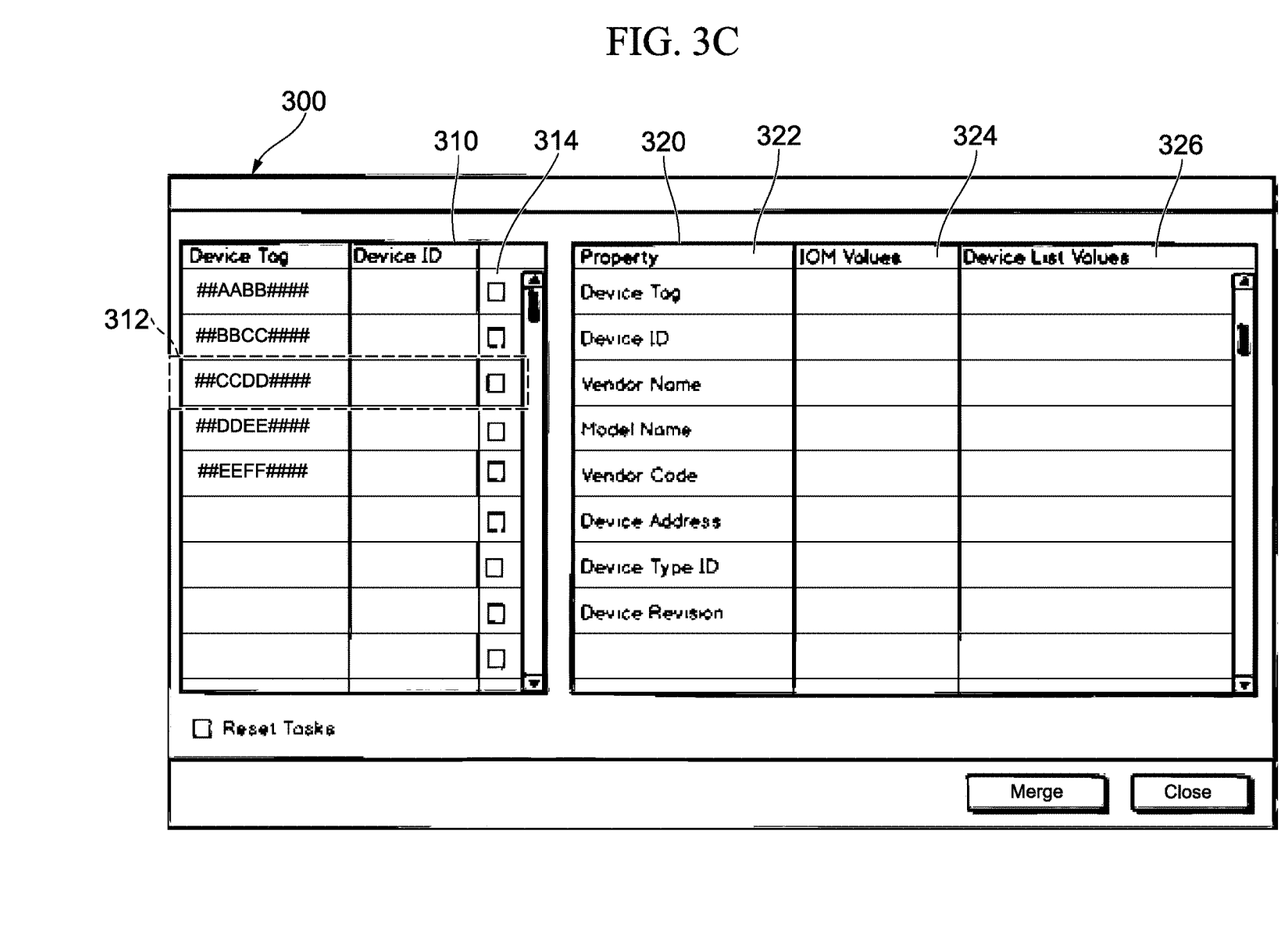

FIG. 3C is an example of the comparison table 300 when field devices 12 connected to IO device 20 are selected. All the field devices 12 are listed in the item area 310 and configuration parameters of a selected field device 12 are listed in the comparison area 320. The selected field device 12 is highlighted as shown in the marked area 312. The check box 314 is selected for the commissioning tool 10 to transfer configuration parameter values 324 of the IO device 20 to the repository 30. According to some embodiments of the invention, the values 324 of the IO device 20 are transferred to the engineering data 32 downloaded from the repository 30. The engineering data 32 is then uploaded to the repository 30 as a replacement or a different revision.

Figure 3D:
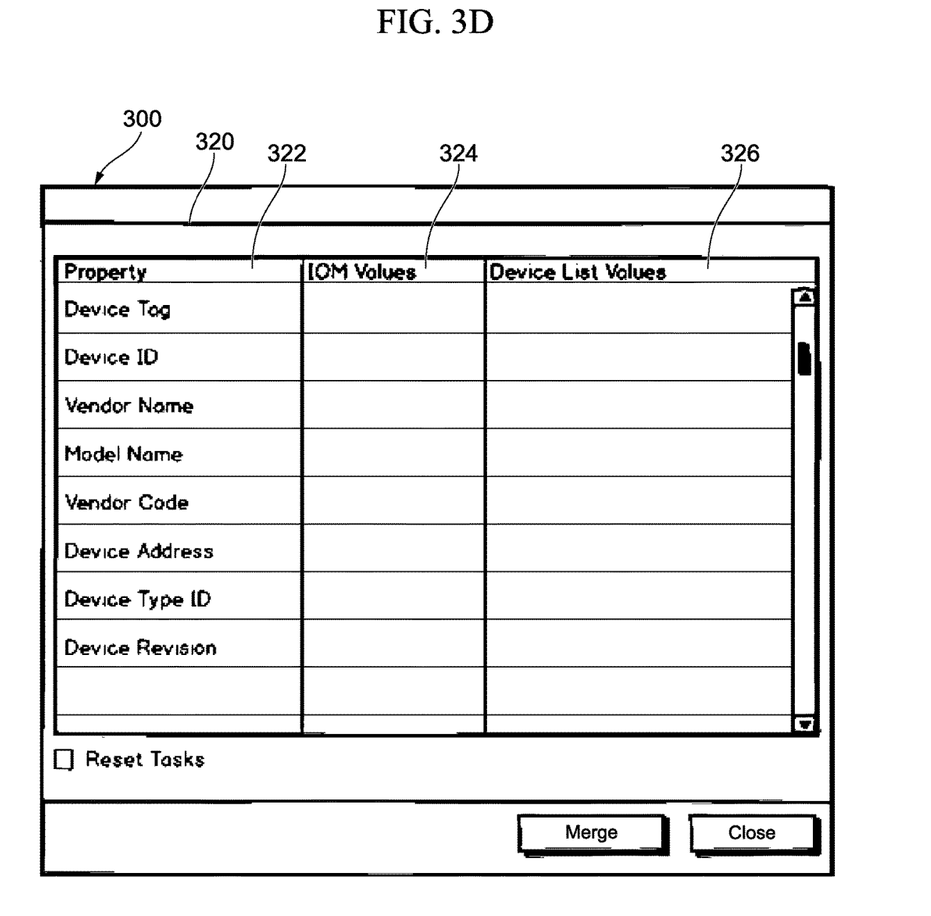

FIG. 3D is an example of the comparison table 300 when one field device 12 is selected according to some embodiments of the invention. Only the comparison area 320 is displayed with the values 324 of the IO device 20 and the values 326 of the repository 30.

Configuration Parameters

According to some embodiments of the invention, the configuration parameters of the IO device 20 retrieved by the IO commissioning tool 10 for comparison may include, but is not limited to, an IO device identifier. In some embodiments of the invention, the IO device 20 is configured as a node in the industrial plant. A configuration parameter of the IO device 20 is node number. Another configuration parameter of the IO device 20 is component number which identifies the physical location of the IO device 20 or node in the industrial plant.

According to some embodiments of the invention, configuration parameters of the IO device 20 are for the IO units 24, 26. Each pair of the primary IO unit 24 and the backup IO unit 26 is referenced as the same slot. Configuration parameters of the IO unit 24, 26 are unit number which is an identifier for the IO unit 24 or 26, or an identifier for a baseplate in which the IO unit 24 or 26 is positioned; a slot number is an identifier of the IO unit 24 or 26, which is referred to as a slot; redundancy identifies if the IO unit is the primary IO unit 24 or the backup IO unit 26; a type of IO model identifies of the IO unit; an IO category identifies a model of the IO unit 24 or 26 or the baseplate of the IO unit 24 or 26.

The IO unit 24 or 26 may include, but is not limited to, a plurality of terminals, wherein each terminal is configured to connect to one or more field devices 12. The field devices 12 are instruments or transmitters which are used to obtain process variables in an equipment or part of an industrial process in the industrial plant. Some devices are used for specific process variables. For example, the field device can be used as a temperature transmitter for temperature process variable, a flowmeter for flowrate process variable, and a pressure transmitter for pressure process variable.

According to some embodiments of the invention, the configuration parameters of the IO device 20 may further include a terminal number which is an identifier for each terminal in the IO unit 24 or 26; an IO type is a signal (input or output) configured to be connected to the terminal; a signal conversion is an IO signal conversion method for which the terminal is configured; and a last update time is the most recent time for which the terminal is last updated.

According to some embodiments of the invention, the configuration parameters of the field device 12 retrieved by the commissioning tool 10 for comparison are a combination of: device tag as an identifier of the field device 12, communication type as communication protocol of the field device 12, device address as a location of the field device 12, device revision as a revision number, device type, and vendor name.

Figure 4:
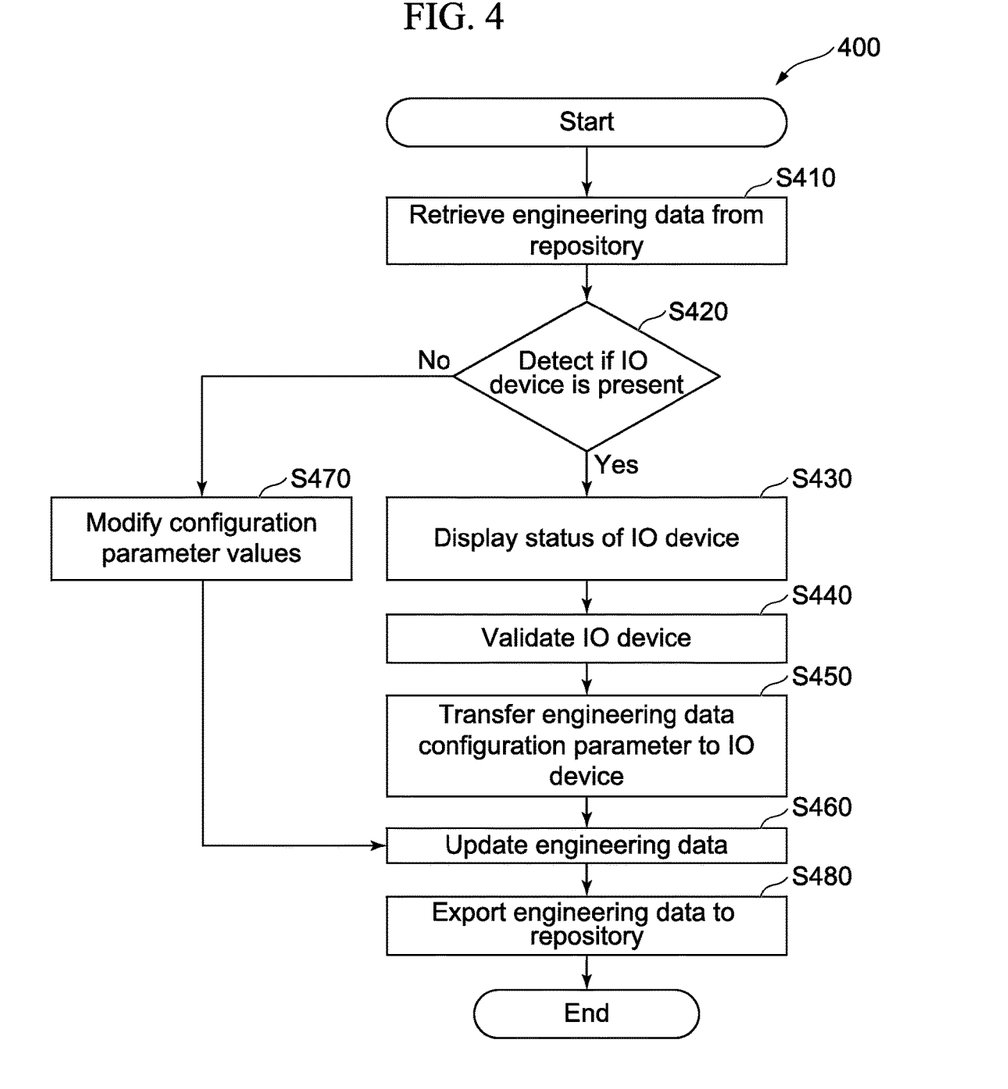
FIG. 4 is a workflow of processes for commissioning a field device according to some embodiments of the invention.

FIG. 4 is a field device commissioning workflow 400 according to some embodiments of the invention. The commissioning tool 10 is a processor configured to perform a field device commissioning method when the commissioning tool 10 is configured to communicate with the repository 30 and the IO device 20.

In Step S410, the commissioning tool 10 retrieves engineering data 32 from the repository 10, the engineering data 32 is relevant to the IO device 20 or the field device 12. Step S420 detects if the IO device 20 is connected to the commissioning tool 10. Step S430 retrieves from the IO device 20 a configuration parameter value for the IO device 20 or the field device 12 when the IO device 20 is connected to the commissioning tool 10. The commissioning tool 10 compares the IO device 20 configuration parameter values with configuration parameter values of the corresponding retrieved engineering data 32. The comparison results are displayed as status of the IO device 20.

Step S440 validates configuration parameters of the IO device 20. The validation is done with user input according to some embodiments of the invention. Validation options are provided for a user to validate the configuration parameters at different levels: the IO device 20, the IO unit 24, channels of the IO unit 24, and the field devices 12.

Step S450 transfers configuration parameters values of the engineering data 32 to configuration parameters of the IO device 20 when there is a difference. Alternatively, in step S470, configuration parameters values of the IO device 20 are updated to the imported engineering data 32.

Step S460 provides a modification of configuration parameters values of the engineering data 32 when the IO device 20 is not connected to the commissioning tool 10. This is an offline mode of the commissioning tool 10.

In step S480, the commissioning tool 10 is configured to export the updated engineering data 32 to the repository 30. The engineering data 32 is stored in the repository 30 as a replacement or a different revision according to different embodiments of the invention.

The above described embodiments of the invention advantageously performs automated checks to ensure that the field devices 12 and the IO device 20 are installed and configured correctly according to the design specifications. The embodiment implemented in the commissioning tool 10 enables the automated check to be done without a need to connect IO device 20 to other systems in the plant such as device management system 56 and the control system 54. This allows the automated checks to be completed before the complete installation of the industrial plant with the device management system 56 or the control system 54. The embodiment validates the configuration parameters in the IO device 20 and the field devices 12 at an early stage and enable configuration when the configuration parameters are not correct. This will improve the efficiency of plant installation and commissioning, saving resources at the same time.

The embodiment ensures that there is a consistency of the field device 12 installed in the industrial plant, the field device 12 connection to the IO unit 24, 26 and the field device 12 connection in the engineering data 32.

Another advantage of the embodiment is that the commissioning tool 10 enables the configuration and validation of the IO unit 24, 26 is configured and validated with the engineering data 32 when other hardware such as field devices 12 and control system 54 are not connected to the IO unit 24, 26. This allows the validation and configuration to be scheduled without depending on the installation schedule of the other field devices 12 and control system 54.

The field device commissioning system includes, not limited to, a commissioning tool configured to communicate with a repository and an IO device. The IO device is configured to communicate with a field device. The commissioning tool includes, not limited to, a first processor configured to retrieve, from the repository, engineering data for the IO device or the field device. The first processor also retrieves, from the IO device, a first configuration parameter value for the IO device or the field device and determines, from the retrieved engineering data, a second configuration parameter value for the IO device or the field device. The second configuration parameter corresponding to the first configuration parameter. The first processor further determines if the first configuration parameter value is the same as the second configuration parameter value, and generates alert on a user interface when the first configuration parameter value is not the same as the second configuration parameter value. The IO device includes, not limited to, a second processor.

The IO devices further includes a network interface unit and an IO unit, the first processor of the commissioning tool is configured to communicate with the network interface unit.

The engineering data is a configuration file.

The first processor is further configured to store, as the retrieved engineering data, the first configuration parameter value when the first configuration parameter value is not the same as the second configuration parameter value.

The first processor is further configured to transmit, to the IO device or the field device, the second configuration parameter value when the first configuration parameter value is not the same as the second configuration parameter value.

The at least one configuration parameter is one of: node number, component number, model name, last update schedule, signal type, signal conversion and field device identifier.

The alert on the user interface is shown for the IO device or field device. The alert is one of: a highlighted area on the user interface, a blinking icon alarm and a highlighted shape outline.

The first and second configuration parameter values are retrieved for a plurality of configuration parameters, the processor is further configured to generate, on the user interface, a list of the plurality configuration parameters, corresponding first configuration parameter values and corresponding second configuration parameter values.

The IO device includes, not limited to, a primary IO unit and a backup IO unit, the second processor is further configured to retrieve the first configuration parameter value from one of the primary IO unit and the backup IO unit, and generate, on the user interface, alert when the first configuration parameter value is not the same as the second configuration parameter value.

The field device management system includes, not limited to, a commissioning tool configured to communicate with a repository and an IO device. The IO device is configured to communicate with a field device. The commissioning tool includes, not limited to a first processor configured to determine if the IO device is in communication with the commissioning tool and retrieve, from the repository, engineering data for the IO device when the IO device is in communication with the commissioning tool. The first processor is also configured to retrieve, from the IO device, a plurality of first configuration parameters values for the IO device or the field device and determine, from the retrieved engineering data, a plurality of second configuration parameters values for the IO device or the field device. The second configuration parameters corresponding to the first configuration parameters. The first processor is further configured to determine if the first configuration parameter value is the same as the second configuration parameter value, generate, on a user interface, alert for the IO device or the field device when at least one first configuration parameter value is not the same as the second configuration parameter value, and generate, on the user interface, user selectable options for the IO device or the field device. The IO device comprises a second processor.

The user selectable options include, not limited to, one of: a validation option to determine the first configuration parameter value is not the same as the second configuration value, a configuration option to transmit the second configuration parameter value to the IO device or the field device when the first configuration parameter value is not the same as the second configuration parameter value, and an update option to store the first configuration parameter value to the retrieved engineering data when the first configuration parameter value is not the same as the second configuration parameter value.

A non-transitory computer readable medium that stores a computer program to be executed by a field device commissioning system to perform a field device commissioning method. The field device commissioning system includes, not limited to, a commissioning tool. The commissioning tool is configured to communicate with a repository and an input-output (IO) device. The field device commissioning method includes, not limited to, retrieving, from the repository, engineering data for the IO device or the field device, retrieving, from the IO device, a first configuration parameter value for the IO device or the field device, and determining, from the retrieved engineering data, a second configuration parameter value for the IO device or the field device. The second configuration parameter corresponding to the first configuration parameter. The field device commissioning method further includes determining if the first configuration parameter value is the same as the second configuration parameter value, and generating, on a user interface, alert when the first configuration parameter value is not the same as the second configuration parameter value. The IO device comprises a second processor.

The field device commissioning method further includes storing, to the retrieved engineering data, the first configuration parameter value when the first configuration parameter value is not the same as the second configuration parameter value.

The field device commissioning method further includes transmitting, to the IO device or the field device, the second configuration parameter value when the first configuration parameter value is not the same as the second configuration parameter value.

The field device commissioning method further includes storing, to the repository, the engineering data updated with the first configuration parameter value.

The systems and methods in the above-described embodiments may be deployed in part or in whole through a machine that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

We claim:

1. A field device commissioning system comprising:
   an input-output (IO) device configured to communicate with at least one field device in a plant;
   a repository that stores engineering data for the IO device or the field device; and
   a commissioning tool configured to communicate with the repository and the input-output (IO) device, the commissioning tool comprising one or more hardware processors and one or more software components which, when executed by the one or more hardware processors, cause the one or more hardware processors to at least:
   retrieve, from the repository, engineering data for the IO device or the field device;
   retrieve, from the IO device, a first configuration parameter value for the IO device or the field device;
   determine, from the retrieved engineering data, a second configuration parameter value for the IO device or the field device, the second configuration parameter corresponding to the first configuration parameter,
determine if the first configuration parameter value is the same as the second configuration parameter value;
generate an alert on a user interface when the first configuration parameter value is not the same as the second configuration parameter value; and
generate, on the user interface, user selectable options for the IO device or the field device.

2. The system in claim 1, wherein the IO device further comprises a network interface unit and an IO unit, the network interface unit being communicatively coupled to the commissioning tool, the IO unit being configured to communicate with the field device.

3. The system in claim 1, wherein the engineering data is a configuration file.

4. The system in claim 1, wherein the one or more software components which, when executed by the one or more hardware processors, cause the one or more hardware processors to further:
store, as the retrieved engineering data, the first configuration parameter value when the first configuration parameter value is not the same as the second configuration parameter value.

5. The system in claim 1, wherein the one or more software components which, when executed by the one or more hardware processors, cause the one or more hardware processors to further:
transmit, to the IO device or the field device, the second configuration parameter value when the first configuration parameter value is not the same as the second configuration parameter value.

6. The system in claim 1, wherein the at least one configuration parameter is one of: node number, component number, model name, last update schedule, signal type, signal conversion and field device identifier.

7. The system in claim 1, wherein the alert on the user interface is shown for the IO device or field device, and wherein the alert is one of: a highlighted area on the user interface, a blinking icon alarm and a highlighted shape outline.

8. The system in claim 1, wherein the first and second configuration parameter values are retrieved for a plurality of configuration parameters, the processor is further configured to generate, on the user interface, a list of the plurality configuration parameters, corresponding first configuration parameter values and corresponding second configuration parameter values.

9. The system in claim 1, wherein the IO device comprises a primary IO unit and a backup IO unit, and the one or more software components which, when executed by the one or more hardware processors, cause the one or more hardware processors to further:
retrieve the first configuration parameter value from one of the primary IO unit and the backup IO unit; and
generate, on the user interface, alert when the first configuration parameter value is not the same as the second configuration parameter value.

10. A field device management system comprising:
an input-output (IO) device configured to communicate with at least one field device in a plant;
a repository that stores engineering data for the IO device or the field device; and
a commissioning tool configured to communicate with the repository and the input-output (IO) device, the commissioning tool comprising one or more hardware processors and one or more software components which, when executed by the one or more hardware processors, cause the one or more hardware processors to at least:
determine if the IO device is in communication with the commissioning tool;
retrieve, from the repository, engineering data for the IO device when the IO device is in communication with the commissioning tool;
retrieve, from the IO device, a plurality of first configuration parameters values for the IO device or the field device;
determine, from the retrieved engineering data, a plurality of second configuration parameters values for the IO device or the field device, the second configuration parameters corresponding to the first configuration parameters;
determine if the first configuration parameter value is the same as the second configuration parameter value;
generate, on a user interface, alert for the IO device or the field device when at least one first configuration parameter value is not the same as the second configuration parameter value; and
generate, on the user interface, user selectable options for the IO device or the field device.

11. The system in claim 10, wherein the user selectable options comprise one of:
a validation option to determine the first configuration parameter value is not the same as the second configuration value,
a configuration option to transmit the second configuration parameter value to the IO device or the field device when the first configuration parameter value is not the same as the second configuration parameter value, and
an update option to store the first configuration parameter value to the retrieved engineering data when the first configuration parameter value is not the same as the second configuration parameter value.

* * * * *